United States Patent [19]

Cobile

[11] Patent Number: 5,226,801
[45] Date of Patent: Jul. 13, 1993

[54] SHOCK ABSORBER TYPE COMPRESSOR

[76] Inventor: Alfredo P. Cobile, 94-179 Awaia St., Waipahu, Hi. 96797

[21] Appl. No.: 931,007

[22] Filed: Aug. 17, 1992

[51] Int. Cl.[5] .......................... F04B 17/06; F04B 21/02
[52] U.S. Cl. .................................. 417/231; 417/233; 417/534
[58] Field of Search ............... 417/229, 231, 233, 534, 417/535, 536, 537

[56] References Cited

U.S. PATENT DOCUMENTS

| | | | |
|---|---|---|---|
| 3,507,580 | 4/1970 | Howard et al. | 417/231 |
| 3,595,012 | 2/1970 | Beck | 60/398 |
| 3,688,359 | 9/1972 | Hudspeth et al. | 417/233 |
| 3,894,405 | 7/1975 | Mielitz | 417/231 |
| 4,061,200 | 12/1977 | Thompson | 417/233 |
| 4,295,538 | 10/1981 | Lewis | 417/231 |
| 4,406,122 | 9/1983 | McDuffie | 417/399 |
| 4,455,124 | 6/1984 | Born et al. | 417/218 |
| 4,514,148 | 4/1985 | Topinka | 417/403 |
| 4,718,836 | 1/1988 | Pottier et al. | 417/534 |
| 4,931,000 | 6/1990 | Fleming | 417/534 |

Primary Examiner—Richard A. Bertsch
Assistant Examiner—Alfred Basichas
Attorney, Agent, or Firm—Michael I. Kroll

[57] ABSTRACT

The present invention relates to a shock absorber pump/compressor which comprises attachments to the car's chassis and to the wheel axle housing; a rack gear that is set into a reciprocating motion as the car runs on the uneven surface of the road; a pinion gear that is rotated back and forth by the rack gear; a crank that is attached fixedly to the shaft of the pinion gear and which sets a double piston to move in a reciprocating manner. A diaphragm is attached to each piston head and the periphery of each diaphragm is clamped tightly between the cylinder and a cylinder head. The interior of each cylinder head and a diaphragm form a contractive and expansive space which draws in fluid from an outside source as the space expands and forces the fluid out as the space contracts. At the same time as fluid is drawn into one contractive/expansive space, fluid is forced out of the other space at the other end of the double piston. The diaphragm not only protects the fluid from contamination by whatever piston lubricant is used behind it, it also prevents leakage of the operating fluid into the piston cylinder. This pumping or compressive action continues as long as there is energy that sets the rack gear in motion.

16 Claims, 4 Drawing Sheets

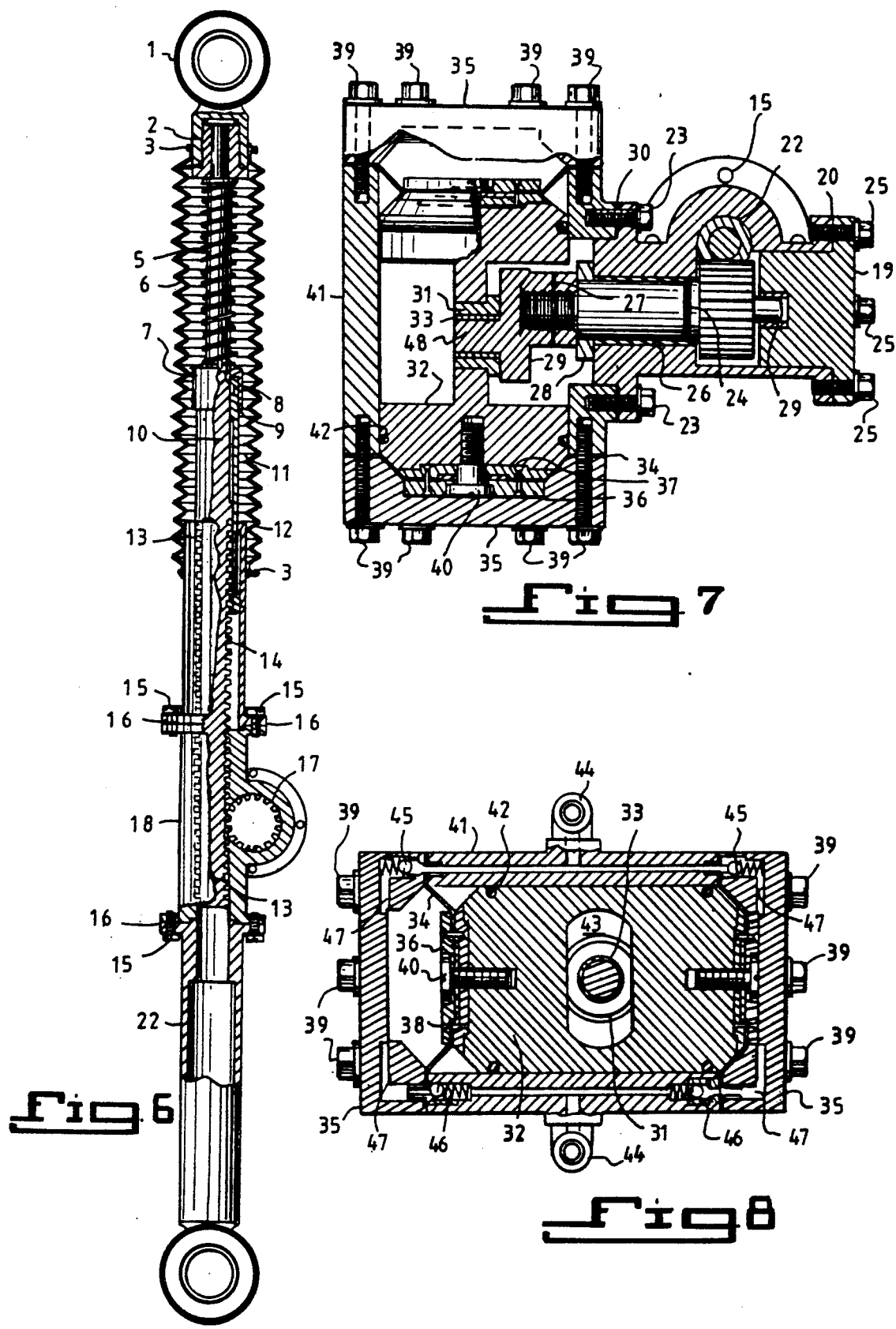

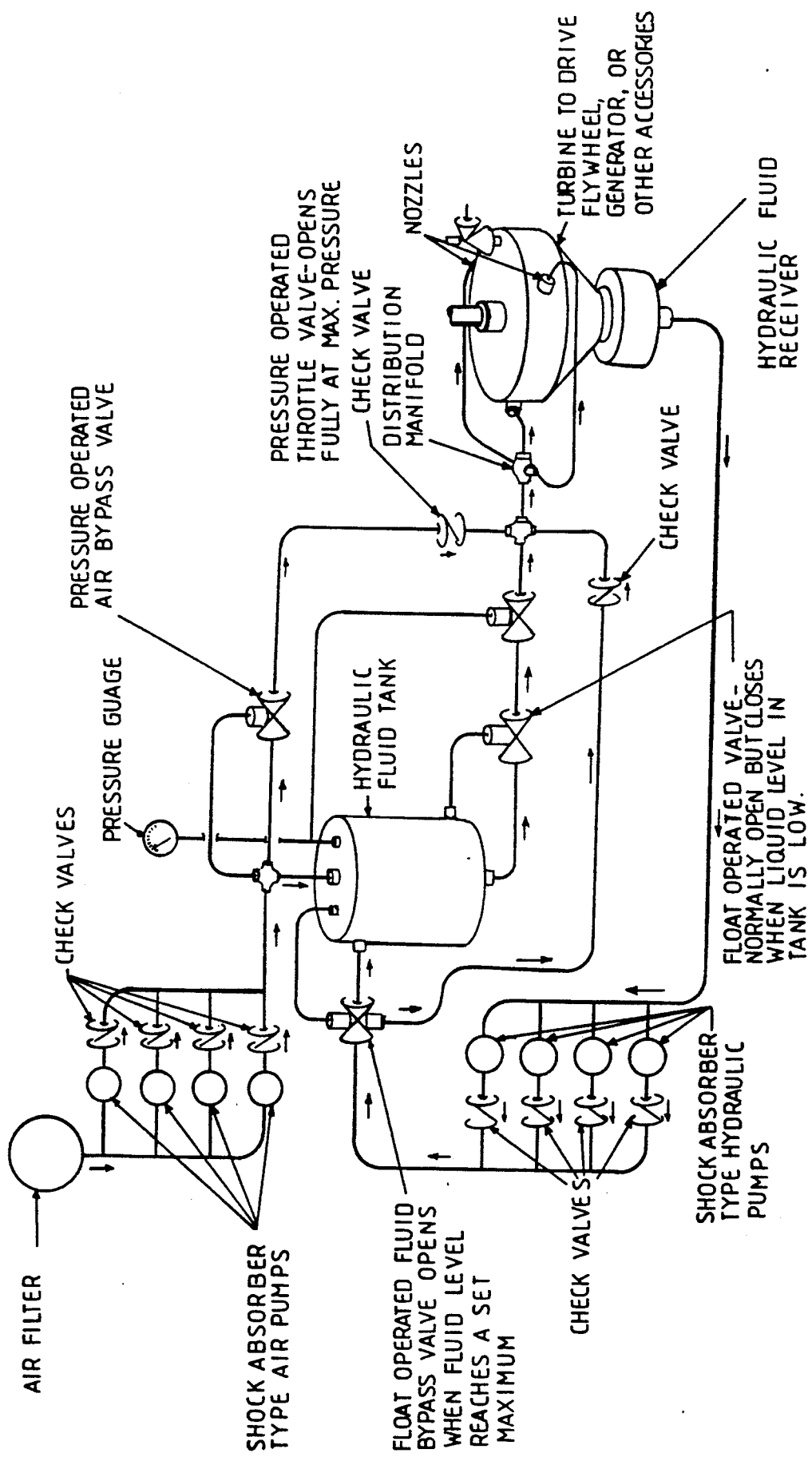

SHOCK ABSORBER TYPE COMPRESSOR

BACKGROUND OF THE INVENTION

1. Field of the Invention

The present invention relates to a compressor.

More particularly, the present invention relates to a shock absorber type compressor.

One use of the shock absorber type compressor in conjunction with shock absorber type of hydraulic pumps is to drive a turbine which will in turn charge the flywheel of a flywheel hybrid vehicle.

Another use of the same kind of turbine driven by the inventive shock absorber type compressor and hydraulic pump is the driving of the battery charger of an electric car.

The shock absorber type hydraulic pumps force hydraulic fluid into the hydraulic fluid tank, through the check valves, and through the fluid bypass valve. At the same time, the shock absorber type compressors pump filtered air through the check valves into the fluid tank. The fluid in the hydraulic tank is thus subjected to a certain high pressure forcing the fluid to flow through a pipe through the normally open float-operated valve, through the pressure-operated valve, through the distribution manifold, and out of the nozzles, turning the rotor of the turbine.

Due to the relief valve, the pressure inside the turbine is reduced to a few degrees above one atmosphere. The spent fluid, now at a much lower pressure, falls into the fluid receiver and is sucked in through the pipe by the hydraulic pumps. The pumps then force the fluid back into the hydraulic fluid tank.

The fluid bypass valve and the air bypass valve are safety valves. Since the amount of fluid in the whole system is originally more than the total volume of the fluid tank part of which are in some pipes and in the hydraulic fluid receiver, there would be moments when the hydraulic fluid tank is full. When this happens, a float in the tank activates the bypass valve, shuts its output into the tank, and opens its bypass port discharging the excess fluid through a pipe, through check valve into the distribution manifold, and out of the nozzles.

At the same time the fluid tank is full of fluid, the air compressors continue to pump air maintaining pressure in the tank and the excess air is forced through the pressure-operated bypass valve, through the pipe, through check valve, through the distribution manifold, and out of the nozzles. At this moment, the hydraulic fluid jetting out of the nozzles is at a greater pressure since there are now three pressures converging into the distribution manifold; namely, air from the air bypass valve, fluid from the hydraulic fluid tank, and fluid from the fluid bypass valve.

A relief valve in the turbine reduces air pressure in the turbine to a point slightly above one atmosphere. This slight pressure on the fluid inside the fluid receiver helps to push the fluid back to the hydraulic pumps.

2. Description of the Prior Art

Numerous innovations for shock absorber type compressors have been provided in the prior art that are adapted to be used. Even though these innovations may be suitable for the specific individual purposes to which they address, they would not be suitable for the purposes of the present invention as heretofore described.

For example, U.S. Pat. No. 4,455,124 to Born et al. teaches a pressure compensated pump which supplies fluid to a common header has an automatic pressure compensator adjustment mechanism which adjusts the pressure setting of the pressure compensator in response to changes in the compensator pressure setting of the pump which is reduced when the displacement of the pump increases to increase pump flow and the pressure setting is increased when the displacement of the pump decreases to reduce pump flow.

The U.S. Pat. No. 3,894,405 to Mielitz teaches a vapour compression refrigeration unit including at least one vapour compressor connected to a condenser and to an evaporator, the compressor includes a piston and cylinder assembly adapted for mounting in a vehicle as a shock absorber therefor and to be operated by compressive forces resulting from relative movement of suitable vehicle components.

The U.S. Pat. No. 3,688,859 to Hudspeth et al. teaches a cylinder having a piston and piston rod assembly reciprocated by a wheel suspension member of the vehicle for the transfer of a fluid to a pressure storage tank. A fluid motor downstream from the tank is operated by a valve regulated flow of air for the controlled operation of various powered systems of the vehicle. An air flow circuit is completed back to the cylinder via a second tank constituting a source of low pressure air. The cylinder is simultaneously charged with a quantity of air on one side of the piston while air is exhausted, under pressure, on the opposite side of the piston.

The U.S. Pat. No. 3,595,012 to Beck Jr. teaches a power source for an underwater tool containing a hollow cylinder filled with a hygroscopic gas. At sea level the gas is maintained at atmospheric pressure so that when lowered to deep ocean depths, high pressure sea water will operate a tool connected thereto and then pass into the cylinder through a small orifice. The hygroscopic gas absorbs the water and maintains a constant low back pressure in the cylinder so that the power available remains constant as the cylinder fills.

Accordingly, it is an object of the present invention to provide a shock absorber type compressor.

More particularly, it is an object of the present invention to provide that the flywheel in flywheel/engine hybrid cars or trucks has to be charged by the engine itself to bring the flywheel to its maximum operating revolution. The present invention, in conjunction with the hydraulic and air pumps can provide the power to drive the hydraulic engine or turbine that charge the flywheel of a gas-flywheel hybrid or batteries of an electric car in such a way that it is totally novel and non-comparative to the prior art.

For example, today's car air conditioner system employs the conventional air compressor that is belt driven by the engine. A good amount of power from the engine is used by the compressor and this diversion of power diminishes the driving force of the wheels.

The present invention may be used to replace or to act as auxiliary to the conventional engine driven freon compressor of the car's air conditioner system. The net effect is that the amount of engine power that would have been used to drive the conventional compressor now would be used to drive the wheels of the vehicle when the present invention takes over.

The same oil in a "turbo-charged" automobile engine is used to lubricate the hot bearings of the charger turbine which causes it to be hot and less viscous. The present invention can be used to pump the hot oil from the engine crankcase through a heat exchanger which reduces the oil temperature, through a filtration device, and finally back to the crankcase.

The present invention can be used as a pump to pump air into a tank somewhere in the car and this air can be used to inflate car tires, to operate a hydraulic jack that is designed to use compressed air instead of manually pumping the hydraulic jack, which is ideal for women drivers, for supercharging the car engine without using exhaust-gas-operated turbochargers or engine driven air pumps, for air bags that protect the driver and the passengers during a crash or collision, and for cooling and/or heating the car interior using an old invention called the "Vortex Tube" which blows hot air at one end of the tube and cold air at the other end.

Sand and debris sucked into the engine of battle tanks shorten the life of the tank engine. The present invention could partly solve the problem. A number of the bigger kind of shock absorber type compressors designed for use in the tank and in combination with other air sources can supply the big volume of clean air that the gas turbine engine needs.

The present invention may be modified and made more massive for adaptation to ocean use. In modified form, the rod end of the pump is attached rigidly to a float, and the body of the pump is attached rigidly to the outer extremity of an extension beam whose other end is rigidly attached to the side of a semi-submerged cylindrical hull. A number of these pumps are arranged around the vertical semi-submerged hull. Provision is made so that the semi-submerged hull does not oscillate up and down with the ocean wave.

Inside the hull would be the generator and the turbine. When the pump floats bob up and down with each wave, high pressure, high velocity streams of non-corrosive fluid stored in the bilge are pumped and directed against the turbine blades, turning the turbine and the generator and producing electricity.

The generated electricity may be made to flow through submarine cables to shore. A number of these electrical generators located at a distance from the shore can supply the electrical power needs of coastal communities.

In keeping with these objects, and with others which will become apparent hereinafter, one feature of the present invention resides, briefly stated, in a shock absorber pump/compressor, including an upper attachment to the car's chassis, a lower attachment to the car's wheel axle, a rack gear for rotating a pinion gear, a pinion gear for rotating the crank that sets a double piston into a reciprocating motion in the cylinder, and a split bushing allowing the insertion of the rack gear through the upper rack guide, through the sliding rack guide, through the sliding rack guide cap, and through the steel coil spring in the assembly process.

In accordance with another feature of the present invention, it further includes a wire clamp for holding a rubber boot to the upper attachment.

Another feature of the present invention is that the rubber boot protects the rack from dust and water.

Yet another feature of the present invention is that a steel coil spring maintains the down position of the sliding rack guide and allows the rack to be extended to its maximum.

Still another feature of the present invention is that the sliding rack guide contains a cap which acts as a spring attachment and is held on by a lock nut.

Yet still another feature of the present invention is that the rack contains teeth which contain grooves so that passage is provided for lubricating fluid through the rack teeth.

Still yet another feature of the present invention is that it further includes a bushing used to assist in a smooth rotation of the pinion.

Another feature of the present invention is that it further includes a pinion compartment and a piston cylinder, leakage of lubricant or lubricants is prevented from the pinion compartment into the piston cylinder by an "0"-ring on the pinion shaft.

Yet another feature of the present invention is that it further includes a pinion gear shaft which uses a bushing to rotate smoothly.

Still another feature of the present invention is that it prevents a crank from unscrewing off the pinion shaft, by the use of a roll pin.

Yet still another feature of the present invention is that it further includes a spacer to prevent lateral movement of the pinion shaft.

Still yet another feature of the present invention is that it further includes pin bearings, a crank pin, and a slide, the pin bearings help to reduce friction between the crank pin an the slide.

Another feature of the present invention is that it further includes a diaphragm assembly and a double piston, a bolt is used to attach the diaphragm assembly to each piston.

Yet another feature of the present invention is that it further comprises two diaphragm assemblies each attached to opposite heads of the double piston by a bolt.

Still another feature of the present invention is that the diaphragm assemblies isolate the operating fluid medium used in the compressor from the lubricant used in the piston cylinder.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 6 is a side view of the present invention in partial section.

FIG. 7 is a top sectional view taken in the direction of line 7—7 of FIG. 4;

FIG. 8 is a side sectional view taken in the direction of line 7—7 of FIG. 4; and FIG. 9 is a schematic of shock absorber type air and hydraulic pumps driving a hydraulic turbine.

DETAILED DESCRIPTION OF THE PREFERRED EMBODIMENT

Figure 1:
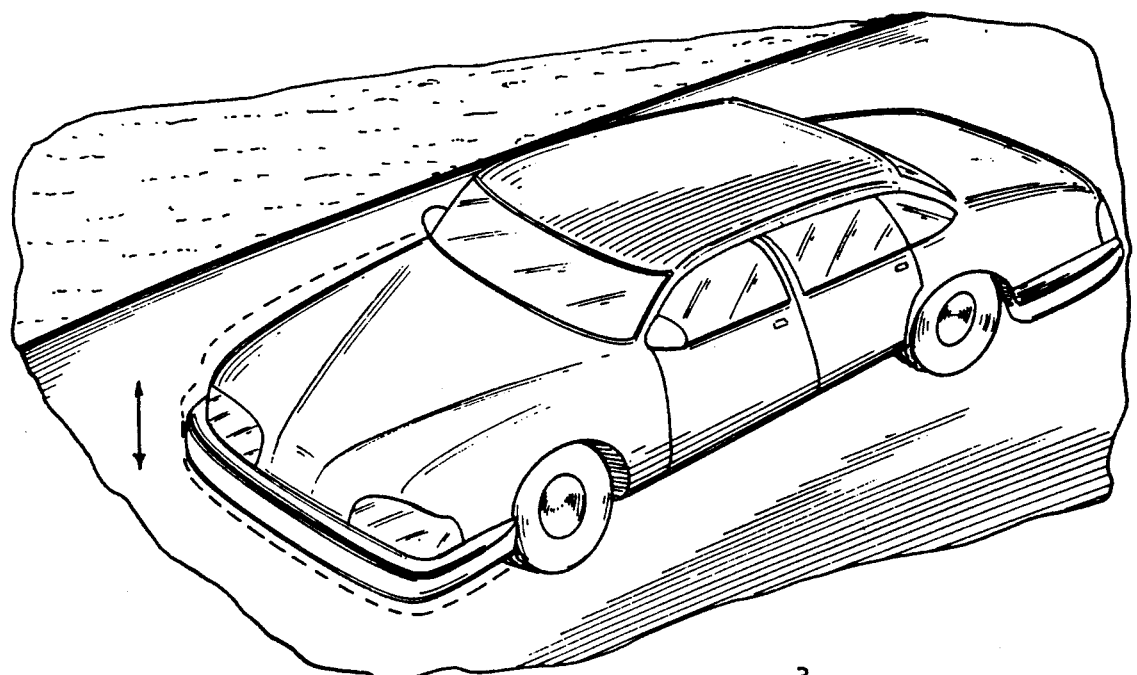
FIG. 1 is a perspective view of an automobile bouncing because of road conditions.
Figure 2:
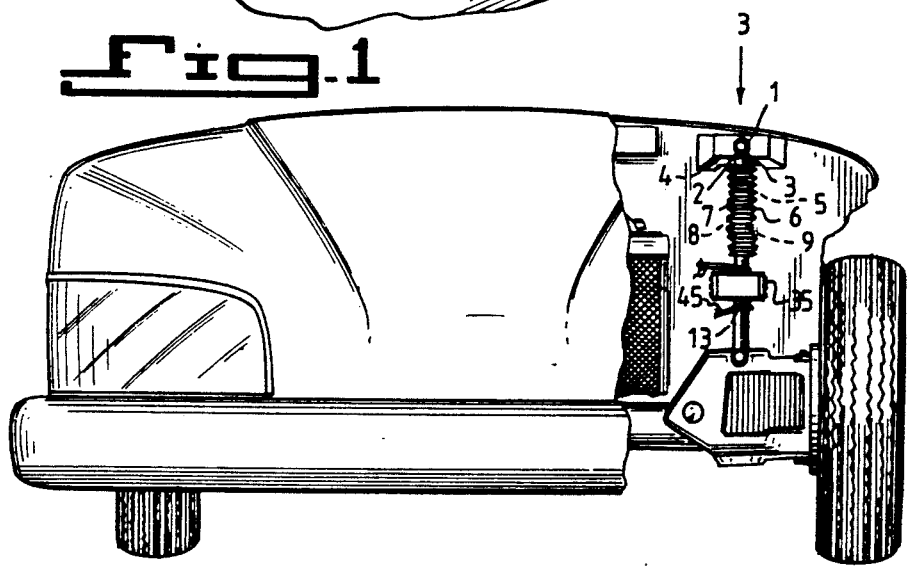
FIG. 2 is a front view of the present invention with the left fender removed.
Figure 3:
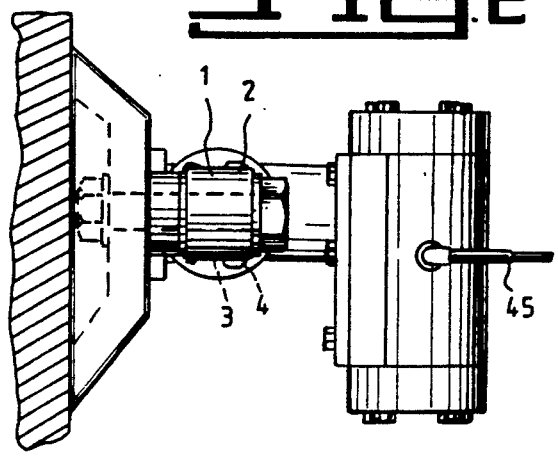
FIG. 3 is a top view of the present invention taken in the direction of arrow 3 of FIG. 2.
Figures 4, 5:
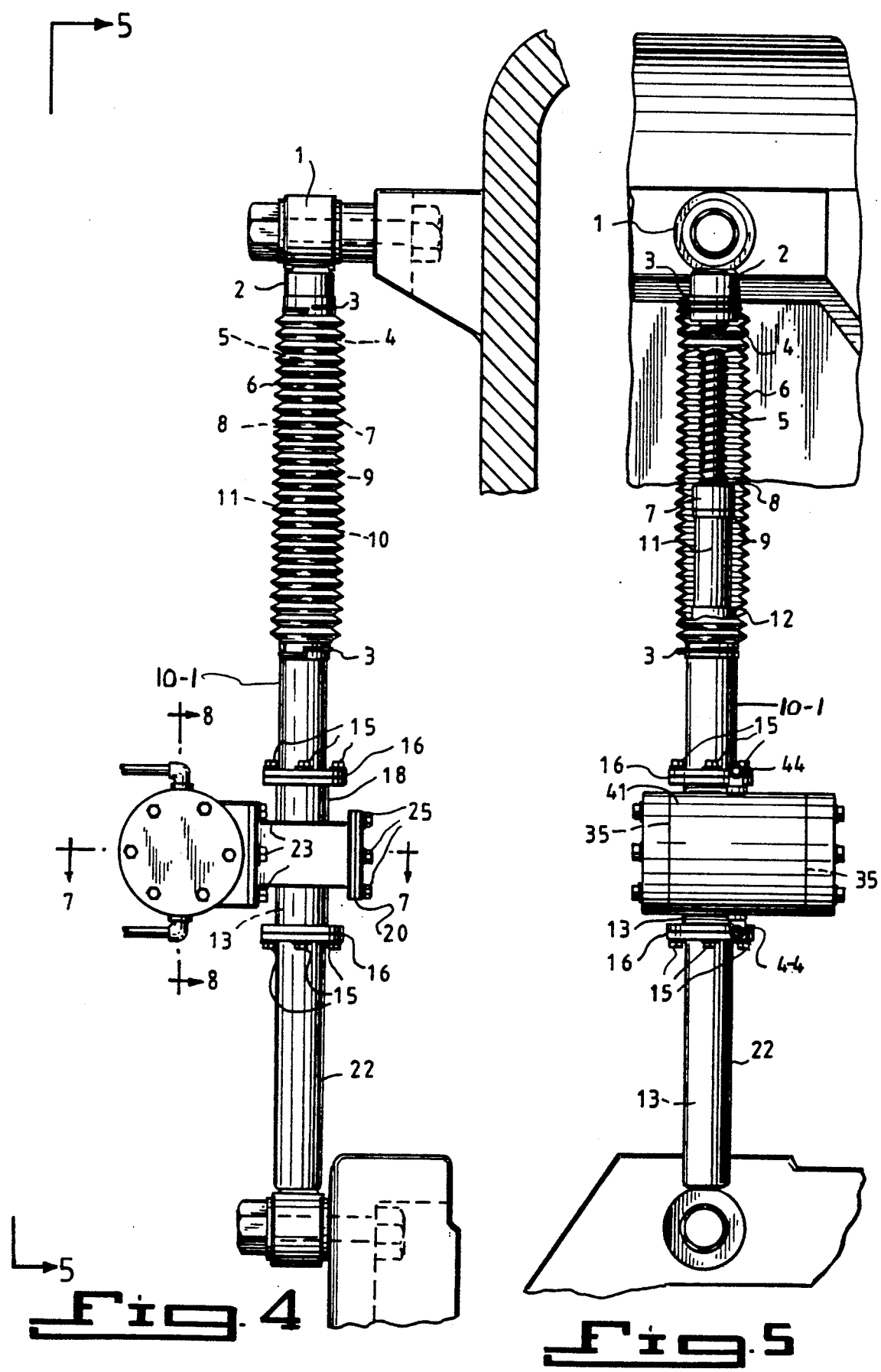
FIG. 4 is a side view of the present invention.
FIG. 5 is a front view of the present invention in more detail taken in the direction of arrows 5—5 of FIG. 4 in partial section.

Elements of the present invention are identified by a respective number in the various figures. If two elements are the same, then their numbers will also be the same throughout the figures.

The shock absorber pump/compressor of the present invention is attached to a car chassis by an upper attachment 1. A split bushing 2 allows the rotation of the rack 10 which rotates the pinion gear 17 back and forth as the rack 10 goes up and down. Also, the split bushing 2 allows the insertion of rack 10 through upper rack guide 10-1, through sliding rack guide 11, through sliding rack guide cap 7, and through steel coil spring 5 in the assembly process. A wire clamp 3 holds the rubber boot 6, fixedly to the upper attachment which protects the rack from dust and water. The boot 6 is held fixedly to the upper attachment 1 by a wire clamp 3. A set screw prevents the split bushing 2 from unscrewing. A steel coil spring 5 maintains the down position of the sliding rack guide 11 and allows the rack 10 to be extended to its maximum. The sliding rack guide 11 has a cap 7 which acts as a spring attachment and is held on by a lock nut 9. Rubber oil seals 8 and 12 are present to prevent the leakage of the lubricant. The grooves 13 reduce the pressure above the flange end of the sliding rack guide 11 allowing lubricant to bleed downward. The rack 10 has teeth which contain grooves 14 so that passage is provided for lubricating fluid through the rack teeth 10.

The upper rack guide 10-1 is held to the main body 18 by bolts 15, while a gasket 16 is sandwiched therebetween to prevent the lubricant from leaking out. The pinion gear 17 is subjected to a stress which the pinion cover 19 with its bearing absorbs and contains a gasket 20 for added protection. To assist in a smooth rotation of the pinion 17 a pin bearing or bushing 21 is used. The rack 10 and the lubricant are guided by the lower rack guide 22. The pinion cover 19 is held tightly to the main body 18 by the bolt 25. In order to prevent leakage of the lubricant from the pinion compartment into the piston cylinder, an "0"-ring 24 is used.

The cylinder 41 is attached to the main body 18 by bolts 23. In order to assure that the pinion gear shaft rotates smoothly a bushing 26 is used. To prevent the crank from unscrewing off the pinion shaft, a roll pin 27 is used. A spacer 28 is used to prevent lateral movement of the pinion shaft.

However the crank 29 is responsible for moving the double piston 32 in the cylinder 41 in a reciprocating motion. A gasket 30 is used to prevent lubricant in the piston compartment from leaking out. To provide a smooth reciprocating movement of the double piston 32, a crank slide 31 is used. The double piston 32 provides the discharge and intake o fluid into the cylinder 41 in conjunction with the diaphragms 34 and the valves 46 and 45. Pin bearings 33 help to reduce friction between a bolt 40 and slide 31.

The diaphragm (convoluted) prevents fluid from leaking into the cylinder 41 and also prevents the contamination of the fluid above the diaphragm 34. A cylinder head 35 covers both ends of the cylinder 41. The diaphragm is sandwiched between discs called diaphragm holders 36 and 37 and are held together by rivets 38. To attach the diaphragm 34 assembly to the piston 32, a bolt 40 is used. To attach the cylinder head 35 to the cylinder 41, a plurality of bolts 39 are used. The cylinder 41 proper houses pistons and all related parts. An "0"-ring or piston ring 42 produces a vacuum behind the diaphragm 34. The crank slide 31 goes back and forth in the slot 43. Discharge/suction fittings 44 provide the connection for discharge or intake fluid lines.

To prevent the high pressure fluid from backing into the compression chamber, a discharge valve 46 is used. To prevent the high pressure fluid from going back in the supply line, a suction valve 45 is used. Connecting holes 47 in cylinder head 35 and in cylinder 41 provide a passageway for compressed or intake fluids through valves 45 and 46.

It will be understood that each of the elements described above, or two or more together, may also find a useful application in other types of constructions differing from the type described above.

While the invention has been illustrated and described as embodied in a shock absorber type compressor, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A shock absorber pump/compressor, comprising:
   a) an upper attachment to a car's chassis;
   b) a lower attachment to a car's wheel axle;
   c) a rack gear for rotating a pinion gear;
   d) a pinion gear for rotating a crank that sets a double piston into a reciprocating motion in a cylinder; and
   e) a diaphragm attached to each piston head for providing a complete isolation of an operating fluid from a lubricant in the piston chamber and to prevent its leakage into the same piston chamber.

2. A compressor as defined in claim 1; further comprising a wire clamp for holding a rubber boot to said upper attachment.

3. A compressor as defined in claim 2, wherein said rubber boot protects said rack from dust and water.

4. A compressor as defined in claim 3, wherein a steel coil spring maintains a down position of a sliding guide rack and allows said rack to be extended to its maximum.

5. A compressor as defined in claim 4, wherein said rack contains a sliding cap which acts as said spring attachment and is held on by a lock nut.

6. A compressor as defined in claim 5, wherein said rack contains teeth which contain grooves so that passage is provided for lubricating fluid through said teeth.

7. A compressor as defined in claim 6; further comprising a bushing used to assist in a smooth rotation of said pinion.

8. A compressor as defined in claim 7; further comprising a pinion compartment and a piston cylinder, leakage is prevented from said pinion compartment into said piston cylinder by an "0"-ring.

9. A compressor as defined in claim 8; further comprising a pinion gear shaft which uses a bushing to rotate smoothly.

10. A compressor as defined in claim 9, wherein to prevent a crank from unscrewing off said pinion shaft, a roll pin is used.

11. A compressor as defined in claim 10; further comprising a spacer to prevent lateral movement of said pinion shaft.

12. A compressor as defined in claim 11; further comprising pin bearings, crank pin, and slide, said pin bearings help to reduce friction between said crank pin and said slide.

13. A compressor as defined in claim 12; further comprising a double piston joined fixedly back to back together by a part integral with said double piston, near upper part of said double piston are installed "0"-rings or piston rings purpose of said "0"-rings or said piston rings is to create and maintain a seal, so as to maintain a vacuum above said rings.

14. A compressor as defined in claim 12; further comprising a diaphragm assembly and a piston, to attach said diaphragm assembly to said piston, a bolt is used.

15. A compressor as defined in claim 13; further comprising two diaphragm assemblies each attached to opposite heads of said double piston by a bolt.

16. A compressor as defined in claim 15, wherein said diaphragm assemblies isolate the operating fluid medium used in said compressor from the lubricant used in said piston cylinder.

* * * * *